(12) United States Patent
Lu

(10) Patent No.: US 7,738,190 B2
(45) Date of Patent: Jun. 15, 2010

(54) OPTICAL ENGINE AND WIDE ANGLE PROJECTION LENS MODULE THEREOF

(75) Inventor: Kai-Chang Lu, Birmingham (GB)

(73) Assignee: Meistream International Optical Ltd., Hong Kong (HK)

( * ) Notice: Subject to any disclaimer, the term of this patent is extended or adjusted under 35 U.S.C. 154(b) by 94 days.

(21) Appl. No.: 12/239,772

(22) Filed: Sep. 27, 2008

(65) Prior Publication Data

US 2010/0079733 A1    Apr. 1, 2010

(51) Int. Cl.
*G02B 17/00* (2006.01)
(52) U.S. Cl. .................... 359/728; 359/771; 359/781; 359/795
(58) Field of Classification Search ......... 359/726–736, 359/754–758, 761, 763–765, 770–772, 774, 359/775, 781, 784–790, 793, 795; 348/774–775; 353/69, 70
See application file for complete search history.

(56) References Cited

U.S. PATENT DOCUMENTS

| | | | |
|---|---|---|---|
| 7,123,426 B2 | 10/2006 | Lu et al. | |
| 7,126,767 B2 | 10/2006 | Lu | |
| 2001/0048558 A1* | 12/2001 | Lin | 359/555 |
| 2001/0050758 A1* | 12/2001 | Suzuki et al. | 353/69 |
| 2003/0067691 A1 | 4/2003 | Kurematsu et al. | |
| 2003/0107716 A1 | 6/2003 | Ogawa | |
| 2005/0200974 A1 | 9/2005 | Nishikawa et al. | |
| 2006/0139577 A1 | 6/2006 | Ikeda et al. | |
| 2009/0079946 A1* | 3/2009 | Chen et al. | 353/69 |

FOREIGN PATENT DOCUMENTS

| | | |
|---|---|---|
| EP | 1205791 A1 | 5/2002 |
| EP | 1852723 A2 | 11/2007 |

* cited by examiner

*Primary Examiner*—Darryl J Collins
(74) *Attorney, Agent, or Firm*—Pai Patent & Trademark Law Firm; Chao-Chang David Pai

(57) ABSTRACT

A wide-angle projection lens module is provided, including a reflective convex aspheric mirror and a refractive lens group of positive refractive power. The following Conditions (1) to (2) are satisfied:

$$15 < |F_{reflective}/F| < 25 \quad \text{Condition (1),}$$

and $$1.5 < |F_{refractive}/f| < 2.0 \quad \text{Condition (2),}$$

wherein, F is a focal length of the wide-angle projection lens module, $F_{reflective}$ is a focal length of the reflective convex mirror, and $F_{refractive}$ is a focal length of the refractive lens group.

39 Claims, 4 Drawing Sheets

OPTICAL ENGINE AND WIDE ANGLE PROJECTION LENS MODULE THEREOF

BACKGROUND OF THE INVENTION

1. Field of the Invention

The present invention relates to a wide-angle projection lens module, and in particular relates to a wide-angle projection lens module for a short throw distance.

2. Description of the Related Art

Digital projectors have been widely used to display video or electronic generated images. Digital projectors require an appropriate display device whether used in education, home entertainment, advertising, or videoconferences.

Throw ratio is a key factor to determine an appropriate display device. In general, the term "throw ratio" can be defined as the throw distance over the picture size (i.e. picture width). Typical throw ratio of conventional projectors is about equal to 2. However, when projection size of the display device increases, the thickness thereof increases with the increased projection size. Therefore, reduced throw ratio is required for large-sized display device.

BRIEF SUMMARY OF THE INVENTION

A detailed description is given in the following embodiments with reference to the accompanying drawings.

In a first embodiment, a wide-angle projection lens module is provided, comprising the following components in sequential order from an output side:

(a) a first lens group with a convex aspheric reflective surface;

(b) a second lens group of negative refractive power having at least one aspheric surface;

(c) a third lens group of substantially zero refractive power, wherein an aperture stop of the wide-angle projection lens module lies within or near the third lens group; and (d) a fourth lens group of positive refractive power, wherein the following Conditions (1) to (4) are satisfied:

$10 < |F_1/F| < 30$  Condition (1);

$4.0 < |F_2/F| < 8.0$  Condition (2);

$25 < |F_3/F| < 50$  Condition (3);

and $3.5 < |F_4/F| < 6$  Condition (4), wherein, F is the focal length of the wide-angle projection lens module, $F_1$ is the focal length of the first lens group, $F_2$ is the focal length of the second lens group, $F_3$ is the focal length of the third lens group, and $F_4$ is the focal length of the fourth lens group.

In the first embodiment, the following Conditions (5) further satisfies:

$|\text{Diameter of the image circle}/F| > 4.5$  Condition (5), where,

Diameter of the image circle is equal to 2 times that of a rear image height.

In the first embodiment, the wide-angle projection lens module has a speed of less than or equal to about F/2.8 and an effective focal length of about 4 mm.

In the first embodiment, the fourth lens group comprises at least four positive lens elements, and an average Abbe value of all the positive lens elements of the fourth lens group is greater than 70.

In the first embodiment, the average Abbe value of all the positive lens elements of the fourth lens group is greater than 80.

In a second embodiment, a wide-angle projection lens module is provided, comprising the following components in sequential order from an output side:

(a) a first lens group with a convex aspheric reflective surface;

(b) a second lens group of negative refractive power, having at least one aspheric surface;

(c) a third lens group of substantially zero refractive power, wherein an aperture stop of the wide-angle projection lens module lies within or near the third lens group; and (d) a fourth lens group of positive refractive power, wherein the following Conditions (1) to (4) are satisfied:

$-25 < (F_1/F) < -15$  Condition (1);

$5 < (F_2/F) < 6$  Condition (2);

$35 < (F_3/F) < 40$  Condition (3);

and $-4.5 < (F_4/F) < -3.5$  Condition (4), where,

F is the focal length of the wide-angle projection lens module;

$F_1$ is the focal length of the first lens group;

$F_2$ is the focal length of the second lens group;

$F_3$ is the focal length of the third lens group; and $F_4$ is the focal length of the fourth lens group.

In the second embodiment, the wide-angle projection lens module of claim 13, wherein the following Conditions (5) further satisfies:

$|\text{Diameter of the image circle}/F| > 4.5$  Condition (5), where,

Diameter of the image circle is equal to 2 times that of a rear image height.

In a third embodiment, a wide-angle projection lens module is provided, comprising the following components in sequential order from an output side:

a first lens group with a convex aspheric reflective surface;

a second lens group of negative refractive power having at least one aspheric surface;

a third lens group of substantially zero refractive power, wherein an aperture stop lies of the wide-angle projection lens module lies within or near the third lens group; and a fourth lens group of positive refractive power, wherein the following Conditions (1) to (4) are satisfied:

$15 < |F_1/F| < 25$  Condition (1);

$5.0 < |F_2/F| < 7.0$  Condition (2);

$35 < |F_3/F| < 40$  Condition (3);

and $4.0 < |F_4/F| < 4.5$  Condition (4), where:

F is the focal length of the wide-angle projection lens module;

$F_1$ is the focal length of the first lens group;

$F_2$ is the focal length of the second lens group;

$F_3$ is the focal length of the third lens group; and $F_4$ is the focal length of the fourth lens group.

In the third embodiment, the following Conditions (5) further satisfies:

angle between any chief ray and optical axis<5 degrees                              Condition (5).

In the third embodiment, the fourth lens group comprises at least four positive lens elements, and an average Abbe value of all the positive lens elements of the fourth lens group is greater than 70.

In the third embodiment, the fourth lens group comprises at least four positive lens elements, and an average Abbe value of all the positive lens elements of the fourth lens group is greater than 80.

In a fourth embodiment an optical engine for a display device is provided, comprising a light source, a relay optical system and a wide-angle projection lens module. The light source provides a light beam. The wide-angle projection lens module comprises a first lens group and a second lens group of negative refractive power. The first lens group has a convex folding aspheric mirror disposed at an output side of the wide-angle projection lens module. The second lens group has at least one aspheric surface, wherein the light beam travels from the light source, passing the relay optical system and the wide-angle projection lens module to generate an output image at a half field angle of at least about 65°, and the output image has substantially no distortion.

In the fourth embodiment, a projection image size of the output image is at least 50 inches (diagonal measurement), and requires substantially no keystone correction.

In the fourth embodiment, a projected image format of the output image is one of a 4×3 format, a 8×5 format and a 16×9 format.

In the fourth embodiment, the second lens group comprises a first lens element of negative refractive power and a second lens element having an aspheric surface, wherein a ratio of a focal length of the second lens group to a focal length of the wide-angle projection lens module ($F_2/F$) has the relationship: $5<F_2/F<6$.

In the fourth embodiment, the wide-angle projection lens module further comprises a third lens group disposed adjacent the second lens group, the third lens group has refractive power, and a ratio of a focal length of the third lens group to a focal length of the wide-angle projection lens module ($F_3/F$) has the relationship: $35<F_3/F<40$.

In the fourth embodiment, the wide-angle projection lens module further comprises a fourth lens group having a positive refractive power disposed adjacent the third lens group, and a ratio of a focal length of the fourth lens group to a focal length of the wide-angle projection lens module ($F_4/F$) has the relationship:

$4.5<F_4/F<-4$.

In the fourth embodiment, the optical engine further comprises:

a third lens group of substantially zero refractive power and wherein an aperture stop of the wide-angle projection lens module lies within or near the third lens group; and a fourth lens group of positive refractive power, wherein the following Conditions (1) to (4) are satisfied:

$15<|F_1/F|<25$                              Condition (1);

$5.0<|F_2/F|<7.0$                            Condition (2);

$35<|F_3/F|<40$                              Condition (3);

and $4.0<|F_4/F|<4.5$                            Condition (4), where:

F is the focal length of the wide-angle projection lens module;

$F_1$ is the focal length of the first lens group;

$F_2$ is the focal length of the second lens group;

$F_3$ is the focal length of the third lens group; and $F_4$ is the focal length of the fourth lens group.

In a fifth embodiment, a wide-angle projection lens module is provided, comprising a reflective convex aspheric mirror and a refractive lens group of positive refractive power, wherein the following Conditions (1) to (2) are satisfied:

$15<|F_{reflective}/F|<25$                   Condition (1);

and $1.5<|F_{refractive}/F|<2.0$                 Condition (2), where:

F is a focal length of the wide-angle projection lens module;

$F_{reflective}$ is a focal length of the reflective convex mirror; and $F_{refractive}$ is a focal length of the refractive lens group.

In the fifth embodiment, a Condition (3) further satisfies:

|Diameter of the image circle/F|>4.5         Condition (3);

where,

Diameter of the image circle is equal to 2 times that of a rear image height.

In the fifth embodiment, a Condition (3) further satisfies:

$|d/F|>10$                                   Condition (3), where, d is a distance between the reflective convex mirror and a first refractive lens (L2) surface.

The wide-angle projection lens module of the embodiment of the invention has a short total track distance for utilization of a compact projection lens, thus minimizing the space requirements of an optical engine.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
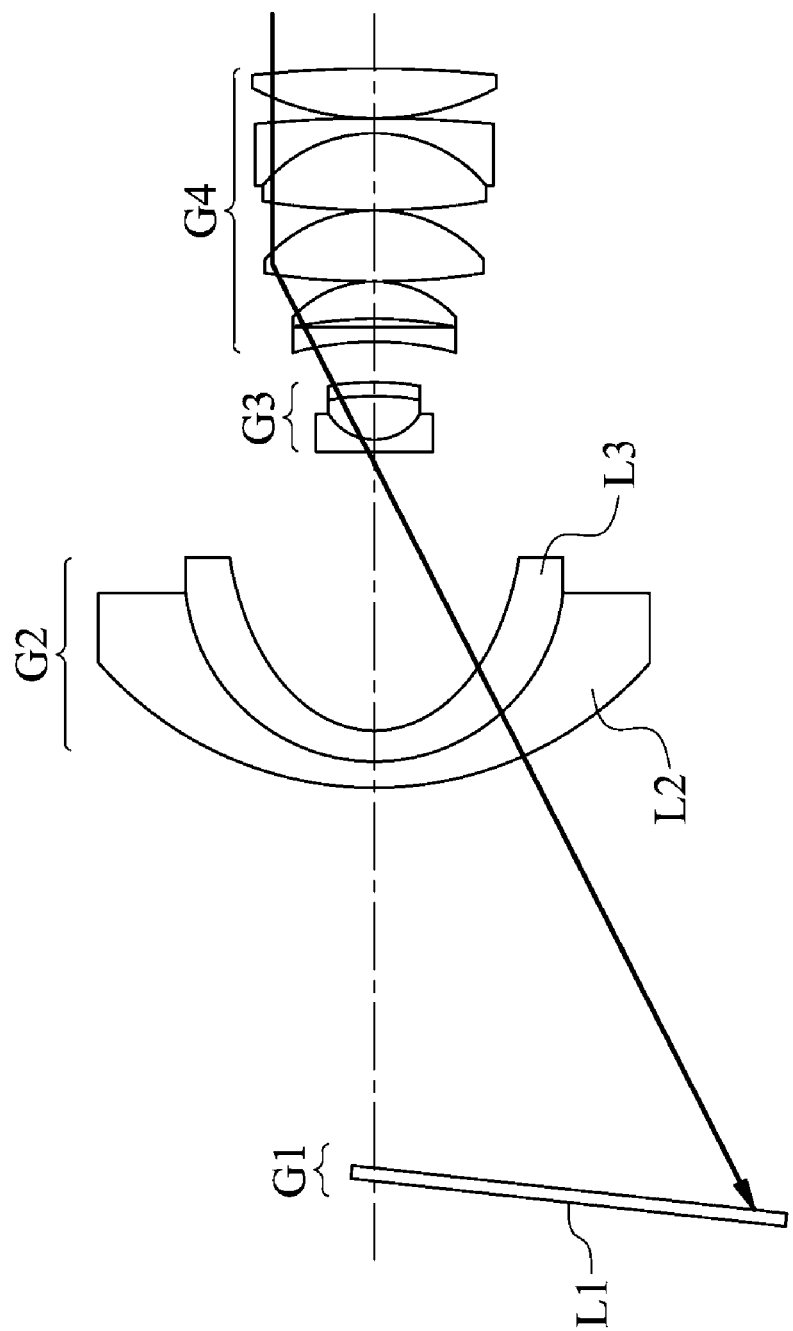
FIG. 1 shows an embodiment of a wide-angle projection lens module of the invention.

FIG. 1 shows an embodiment of a wide-angle projection lens module 1 of the invention, which comprises four lens groups (as described from an output side): a first lens group G1, a second lens group G2, a third lens group G3, and a fourth lens group G4. The term "output side" means the side of the projection lens with a large aspheric reflection folding mirror (first lens group G1).

As shown in FIG. 1, the first lens group G1 comprises a first lens element L1 which is an aspheric reflection mirror. Preferably, the first lens group G1 is a convex aspheric mirror. The ratio of $F_1/F$ in the first lens group G1 can be $-30<F_1/F<-10$, wherein $F_1$ is the focal length of the first lens group, and F is a focal length of the wide-angle projection lens module which is negative in refractive power due to the first lens group G1. The second lens group G2 includes a second lens element L2 of negative refractive power and a third lens element L3 having an aspheric surface on its surface. Preferably, the second lens group G2 is of negative refractive power. A ratio of $F_2/F$ in the second lens group the second lens group G2 can be $4.0<F_2/F<8.0$, wherein $F_2$ is the focal length of the second lens group. The third lens group G3 includes three lens elements which are affixed or cemented together by adhesive. The third lens group G3 is substantially of small refractive power. Preferably, the third lens group G3 is slightly negative in refractive power. The ratio of $F_3/F$ in the third lens group G3 can be $25<F_3/F<50$, wherein $F_3$ is the focal length of the third lens group. In this exemplary embodiment, an aperture stop of the wide-angle projection lens module 1 lies within or near the third lens group G3. The fourth lens group G4 includes six lens elements. Preferably, the fourth lens group G4 is of positive refractive power. The ratio of $F_4/F$ in the fourth lens group G4 can be $3.5<|F_4/F|<6.0$, wherein $F_4$ is the focal length of the fourth lens group.

The first lens group G1 is preferably a convex aspheric mirror, particularly a high order aspheric folding mirror with a rotational symmetrical to optical axis. The aspheric profile of the folding mirror surface reduces the distortion of the wide-angle projection lens module 1. For example, the first lens element L1, lying closest to the output side, can have the largest diameter of all the lenses in the four lens groups. In a modified embodiment, the first lens element L1 in the first lens group has a sufficiently large diameter to project an image at a large field, i.e., with a half field angle greater than 60°, preferably greater than 70°, and most preferably about 68° in the direction of the output side, with substantially no distortion.

In one embodiment, the first lens element L1 of the first lens group has a diameter greater than 300 mm and less than 350 mm. In a modified embodiment, the first lens element L1 of the first lens group has a diameter of about 316 mm. Thus, the first lens element can provide a field of view of about 120° to about 140°.

The first lens element L1 can be a reflection mirror having only one aspheric reflective surface, which reduces distortion effects and provides a large field of view. The shape of the aspheric surface can be defined by the equation below:

$$Z = \frac{cr^2}{1 + \sqrt{1-(1+k)c^2r^2}} + \alpha_2 r^2 + \alpha_4 r^4 + \alpha_6 r^4 + \alpha_8 r^8 + \alpha_{10} r^{10} + \alpha_{12} r^{12}, \quad \text{Equation I}$$

wherein Z is the surface sag at a distance r from the optical axis of the system, c is the curvature of the lens at the optical axis in $\frac{1}{mm}$, r is the radial coordinate in mm, k is the conic constant, $\alpha_2$ is the coefficient for second order term, $\alpha_4$ is the coefficient for fourth order term, $\alpha_6$ is the coefficient for sixth order term, $\alpha_8$ is the coefficient for eighth order term, $\alpha_{10}$ is the coefficient for tenth order term, and $\alpha_{12}$ is the coefficient for 12th order term.

Figure 2A:
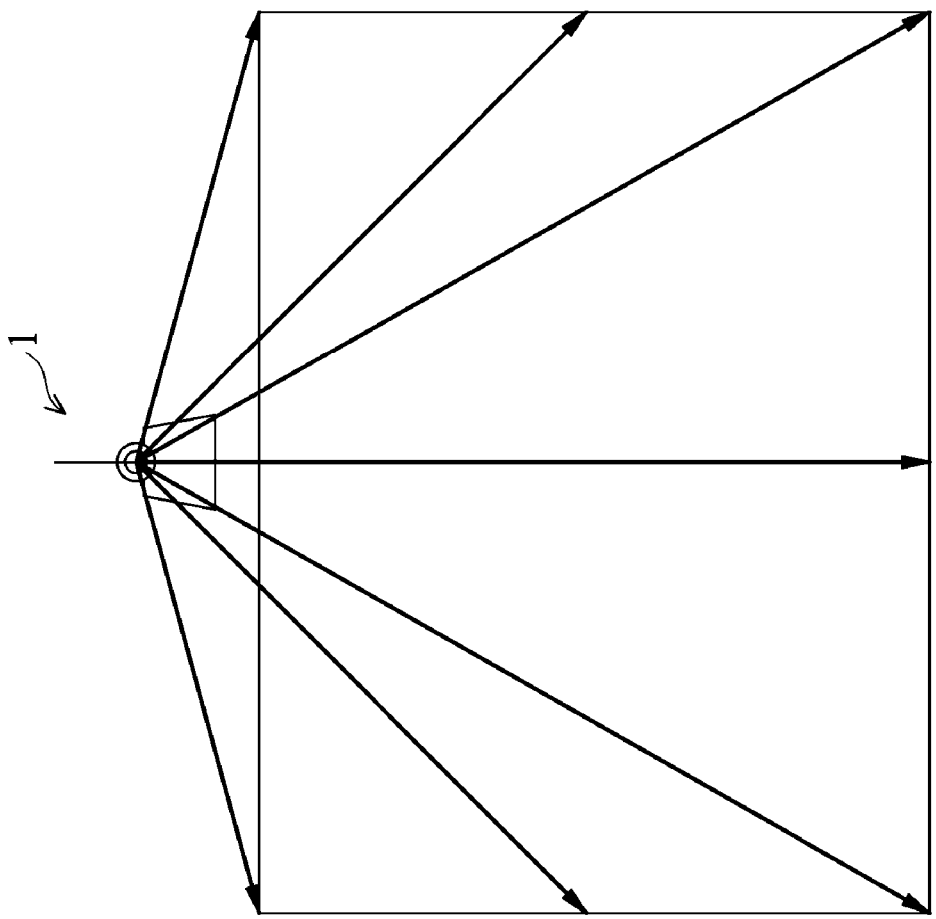
FIG. 2A is a front view showing a projection light path of the embodiment.
Figure 2C:
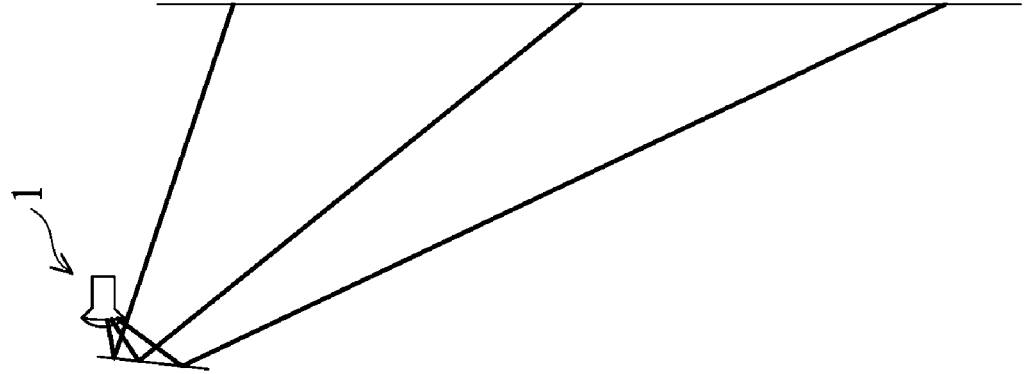
FIG. 2C is a side view showing the projection light path of the embodiment.
Figure 2B:
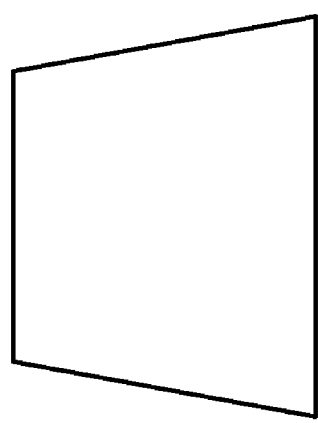
FIG. 2B shows an embodiment of the first lens element.

As shown in FIGS. 1, 2A and 2C, with reference to FIG. 2B, an usage area of the first lens element L1 during front projection application is at an off-axis location, and hence the outer aperture shape of the first lens element L1 is preferably a rectangular (about 125 mm×165 mm) or ladder shape (with a height about 125.2 mm, top width about 120 mm and bottom width about 165 mm). In one aspect, the first lens element can be fabricated by an optical generated, lapped and polished glass or metal such as copper and aluminum. It can also be fabricated by molding polymer such as polymethyl methacrylate (PMMA) or acrylic.

In a modified embodiment, the first shaped element comprises a slightly curved surface with uniformed thickness.

The second lens group G2 is preferably of negative refractive power. In an embodiment, the second lens group G2 comprises a plurality of lens elements. For example, the second lens element L2 of the second lens group G2, lying closest to the output side, can have the largest diameter of all the remaining refractive lenses in the second lens group G2.

In a modified embodiment, the second lens element L2 in the second lens group has a diameter greater than 60 mm and less than 70 mm, preferably about 63 mm.

As shown in FIG. 1, the second lens group G2 further includes the third lens element L3 having at least one aspheric surface. The aspheric surface thereof reduces distortion effects, while still providing a large field of view. In one aspect, the third lens element L3 can be of optical polymer having a refractive index of about 1.49 and an Abbe number of about 57.2, such as polymethyl methacrylate (PMMA). The shape of the aspheric surface can also be defined by the above equation I.

A surface of the second element L2 of the second lens group has a radius of curvature substantially equal to the radius of curvature of a surface of the third lens element L3 corresponding thereto.

In a modified embodiment, the second lens group G2 includes two meniscus shaped; nested lens elements, a first meniscus shaped element made of glass and a second meniscus shaped element made of plastic.

In another embodiment, the third lens element L3 is a dome-shaped aspheric lens having a substantially uniform thickness. The dome-shaped design reduces thermal problems, and is easily produced.

In a modified embodiment, the second lens element L2 and the third lens element L3 are molded together as a single element. Additionally, the material of the second lens element L2 and the third lens element L3 differs. For example, the second lens element L2 can be a glass element, and the third lens element L3 can be a plastic (e.g., PMMA) element.

In another modified embodiment, the second lens group G2 can be a single element (e.g., a single PMMA element), with a single aspheric surface, or two aspheric surfaces.

As shown in FIG. 1, the third lens group G3 is of substantially small refractive power. The third lens group G3 comprises a plurality of lens elements. The aperture stop of the wide-angle projection lens module can lie within or close the third lens group.

In one embodiment, all lens elements of the third lens group G3 have spherical surfaces. The third lens group G3 includes a cemented triplet to control spherical aberration and coma.

In another embodiment, the third lens group G3 provides a longer effective focal length.

In another embodiment, a doublet element can be utilized in the third lens group G3, which can include an aspheric surface.

The fourth lens group G4 can be of positive refractive power and all lens elements in this lens group can have spherical surfaces. The fourth lens group G4 provides color aberration correction (i.e., primary and secondary dispersion compensation).

By way of example, for the embodiment shown in FIG. 1, Table 1 below lists the surface number, in order from the output side (with surface 1 being the reflective folding mirror's surface of the first lens element L1), the curvature (c) near the optical axis of each surface (in 1/millimeters), the on axis spacing (D) between the surfaces (in millimeters), and the glass type is also indicated. Surface 0 is the object surface or the surface of the projection screen. In this embodiment, the wide-angle projection lens module has an effective overall focal length of −4.35 mm, a half field angle of 68.2° in the direction of the output side and operates at F/2.5. The first lens group G1 has an effective focal length of 92.6 mm, the second lens group G2 has an effective focal length of −26.4 mm, the third lens group G3 has an effective focal length of −164.4 mm, and the fourth lens group G4 has an effective focal length of 18.5 mm. The projection lens has a total track of 156 mm in this exemplary embodiment.

Furthermore, the projection lens can be defined into two groups. One is the reflective group ($G_{reflective}$) which is the convex aspheric folding mirror and another group is the refractive lens group ($G_{refractive}$). The reflective group $G_{reflective}$ has an effective focal length of 92.6 mm and the refractive group $G_{refractive}$ has an effective focal length of 7.66 mm.

For the embodiment in FIG. 1, the first reflective surface in the first lens group (denoted as surface XX in Table 1) is aspheric, as governed by Equation I above, and has the following values for the coefficients:

c=0.005396844, k=−38.766129, $\alpha_2$=0, $\alpha_4$=1.866192×10$^{-8}$, $\alpha_6$=−9.526963×10$^{-13}$, $\alpha_8$=2.852074×10$^{-17}$, $\alpha_{10}$=−4.292796×10$^{-22}$, and $\alpha_{12}$=2.327975×10$^{-27}$ For the embodiment in FIG. 1, the surface of the third lens element (L3) in the second lens group (denoted as surface XX in Table 1) is aspheric, as governed by Equation I above, and has the following values for the coefficients:

c=0.09938788, k=−0.663836, $\alpha_2$=0, $\alpha_4$=3.000570×10$^{-5}$, $\alpha_6$=−2.916595×10$^{-7}$, $\alpha_8$=2.135367×10$^{-9}$, $\alpha_{10}$=−6.889318×10$^{-12}$, and $\alpha_{12}$=1.005630×10$^{-14}$ The wide-angle projection lens module 1 of the embodiment of FIG. 1 has a total track distance of 156 mm. As one skilled in the art will appreciate, in certain applications, such as front-projection and rear projection display applications, it can be advantageous to have a short total track distance because it would result in a compact projection lens, thus minimizing the space requirements of the overall optical engine.

TABLE 1

| Surface No. | C (mm$^{-1}$) | D (mm) | Glass Type |
|---|---|---|---|
| 0 | 0 | −580.00 | |
| 1 | −0.00539 | 0.00 | Mirror |
| 2 | 0 | 50.00 | |
| 3 | 0.02337 | 3.000 | N-SK15 |
| 4* | 0.04545 | 3.500 | Acrylic |
| 5 | 0.09939 | 31.968 | |
| 6 | 0.00374 | 1.500 | N-LAF34 |
| 7 | 0.1630 | 5.200 | N-F2 |
| 8 | −0.03974 | 1.500 | N-LAF34 |
| 9 | −0.02623 | 4.719 | |
| 10 | −0.02981 | 1.800 | N-LAK8 |
| 11 | −0.00152 | 0.812 | |
| 12 | −0.02927 | 4.33 | N-PK52 |
| 13 | −0.07755 | 0.147 | |
| 14 | 0.00907 | 7.906 | N-PK52 |
| 15 | −0.05752 | 0.147 | |
| 16 | 0.01289 | 8.937 | N-PK52 |
| 17 | −0.06002 | 1.600 | N-SF6 |
| 18 | −0.008357 | 0.147 | |
| 19 | 0.03077 | 5.22 | N-PK52 |
| 20 | −0.00526 | 2.20 | |
| 21 | 0 | 18.486 | N-BK7 |
| 22 | 0 | 0.84 | |
| 23 | 0 | 1.05 | N-FK5 |
| 24 | 0 | 1.11 | |

Tables 2 and 3 below list the general lens data and the surface data summary for the embodiment of FIG. 1.

TABLE 2

GENERAL LENS DATA:

| | |
|---|---|
| Surfaces | 24 |
| Stop | 9 |
| System Aperture | Image Space F/# - 2.5 |
| Glass Catalogs | schott_2000 OHARA MISC |
| Ray Aiming | Real Reference, Cache On |
| X Pupil Shift | 0 |
| Y Pupil Shift | 0 |
| Z Pupil Shift | 0 |
| Apodization | Uniform, Factor = 1.00000E+000 |
| Effective Focal Length | −4.35119 (in air) |
| Effective Focal Length | −4.35119 (in image space) |
| Back Focal Length | −1.01245 |
| Total Track | 156.1187 |
| Image Space F/# | 2.5 |
| Paraxial Working F# | 2.500584 |
| Working F/# | 2.512801 |
| Image Space NA | 0.1960721 |
| Object Space NA | 0.001403287 |
| Stop Radius | 3.91982 |
| Paraxial Image Height | 11.50 |
| Paraxial Magnification | −0.007018084 |

TABLE 2-continued

GENERAL LENS DATA:

| | |
|---|---|
| Entrance Pupil Diameter | 1.740476 |
| Entrance Pupil Position | −40.14171 |
| Exit Pupil Diameter | 52.26916 |
| Exit Pupil Position | −130.5756 |
| Field Type | Paraxial Image height in millimeters |
| Maximum Field | 11.5 |
| Primary Wave | 0.55 |
| Lens Units | Millimeters |
| Angular Magnification | −0.03329914 |

TABLE 3

SURFACE DATA SUMMARY:

| Surf | Type | Comment | Radius | Thickness | Glass | Diameter | Conic |
|---|---|---|---|---|---|---|---|
| OBJ | STANDARD | | Infinity | −580.00 | | 3277 | −38.76613 |
| 1 | EVENASPH | | −185.294 | 0.00 | Mirror | 328 | 0 |
| 2 | STANDARD | | Infinity | 50.00 | | 300 | 0 |
| 3 | STANDARD | | 42.797 | 3.000 | N-SK15 | 63 | 0 |
| 4 | STANDARD | | 22.000 | 3.500 | Acrylic | 44 | −0.8938386 |
| 5 | EVENASPH | | 10.062 | 31.968 | | 32 | 0 |
| 6 | STANDARD | | 267.259 | 1.500 | N-LAF34 | 13.0 | 0 |
| 7 | STANDARD | | 6.135 | 5.200 | F2 | 10.6 | 0 |
| 8 | STANDARD | | −25.162 | 1.500 | N-LAF34 | 10.6 | 0 |
| STO | STANDARD | | −38.120 | 4.719 | | 10.6 | 0 |
| 10 | STANDARD | | −33.5482 | 1.800 | N-LAK8 | 19 | 0 |
| 11 | STANDARD | | −656.534 | 0.812 | | 15.2 | 0 |
| 12 | STANDARD | | −34.162 | 4.33 | N-PK52 | 15.2 | 0 |
| 13 | STANDARD | | −12.895 | 0.147 | | 19 | 0 |
| 14 | STANDARD | | 110.286 | 7.906 | N-PK52 | 25.5 | 0 |
| 15 | STANDARD | | −17.386 | 0.147 | | 25.5 | 0 |
| 16 | STANDARD | | 77.574 | 8.937 | N-PK52 | 26 | 0 |
| 17 | STANDARD | | −16.662 | 1.600 | N-SF6 | 26 | 0 |
| 18 | STANDARD | | −119.663 | 0.147 | | 27.5 | 0 |
| 19 | STANDARD | | 32.5 | 5.22 | N-PK52 | 28.5 | 0 |
| 20 | STANDARD | | −234.781 | 2.20 | | 28.5 | 0 |
| 21 | STANDARD | | Infinity | 18.486 | N-BK7 | 28 | 0 |
| 22 | STANDARD | | Infinity | 0.84 | | 28 | 0 |
| 23 | STANDARD | | Infinity | 1.05 | N-FK5 | 28 | 0 |
| 24 | STANDARD | | Infinity | 1.11 | | 28 | 0 |

The data provided in the Tables above represent one example and are not intended to limit the scope of the invention described herein.

Figure 3:
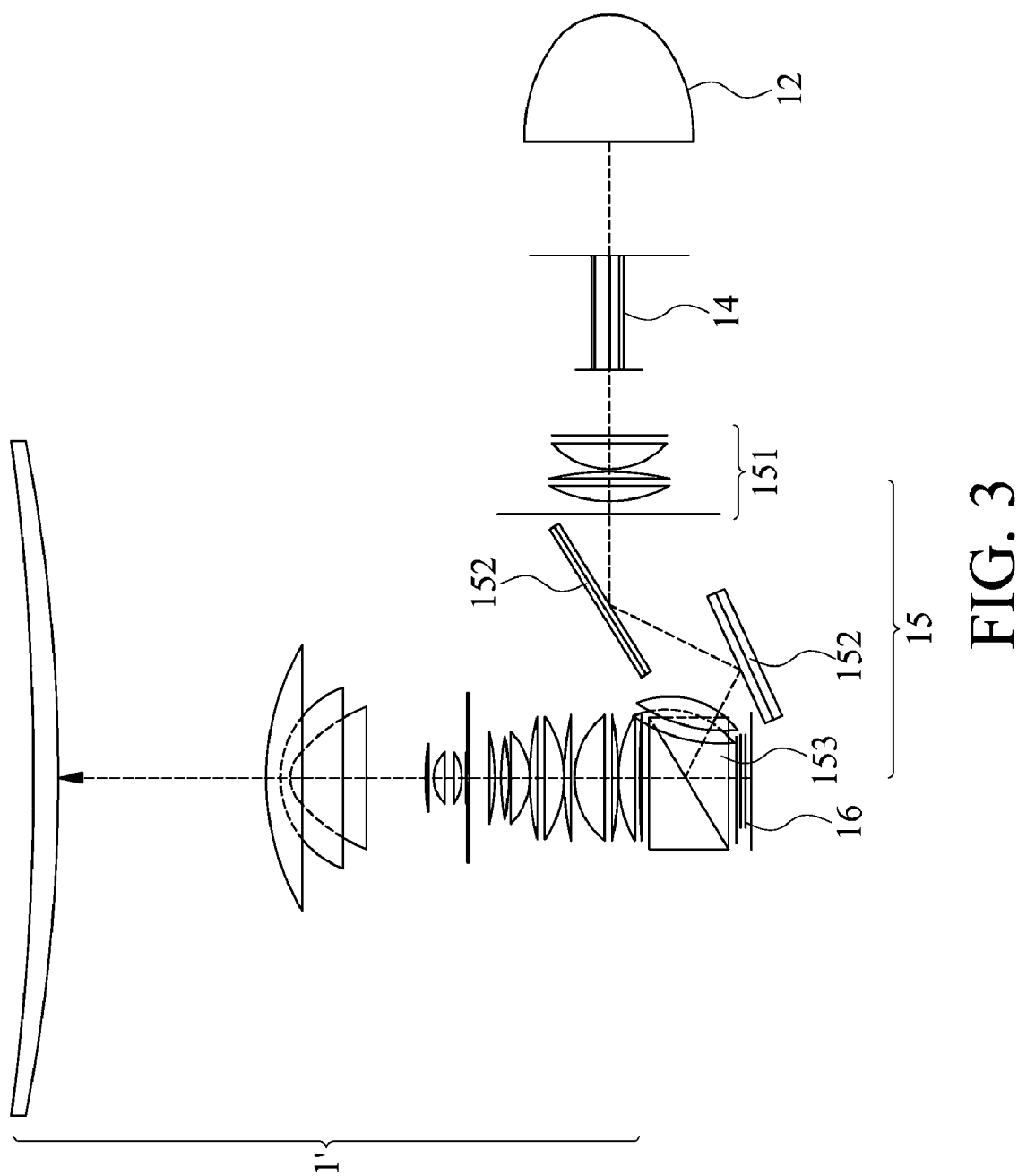
FIG. 3 shows an optical engine of an embodiment of the invention.

FIG. 3 shows an optical engine 10 of an embodiment of the invention having the following components: a light source 12, an integrating element 14, a relay element 15, an imager 16, and a wide-angle projection lens module 1'. The light source 12 can be an arc lamp (with a reflector) or an LED source. The integrating element 14 can be an integrating tunnel or an integrating lens array, or be omitted. The relay element 15 comprises a condensing element 151, flat folding mirrors 152 and a prism 153. In FIG. 3, when the prism 153 is a Total Internal Reflection (TIR) prism, the imager 16 is a reflective imager such as a Digital Lighting Processor (DLP) and a Liquid Crystal On Silicon (LCOS). When the prism 153 is an X-cube, the imager 16 will be a transmitting imager like Liquid Crystal Devices (LCD). FIG. 3 shows an optical engine utilized in a projection display system. Each element in the optical engine is discussed in detail below.

The light source 12 includes a lamp unit, a filter (such as an infrared light and/or a ultraviolet light rejection filter), and a color separation means. In one embodiment, the lamp unit includes a reflector and a lamp.

The integrating element 14 is used to adjust light intensity distribution to improve light uniformity. However, some light sources such as an LED may have sufficient uniformity in light intensity, and hence the integrating element can be omitted.

In one embodiment, the relay element 15 is used to relay the tunnel end or the LEDs onto the imager 16. In FIG. 3, one aspheric condensing surface is used to improve relay image sharpness.

The imager 16 can be an XGA digital micromirror device (DMD) having a diagonal dimension of about 14 mm. Alternatively, a transmitting or reflective liquid crystal display (LCD) can be used as the imager. In one embodiment, the surface of the imager is positioned substantially parallel to the surface of a projection screen.

The optical engine of the embodiment of the invention can have a V-shape type layout, a Z-shape type layout, a T shape type, or an L-shape type layout, depending on the type of imager or illumination system utilized. As a wide angle/short throw type optical engine can provide an image at a large field, i.e., at a half field angle greater than 50°, preferably greater than 60°, and most preferably about 70°, the throw distance can be reduced from that of conventional front projection display devices. For example, the throw distance can be 23 inches and the diagonal picture size would be about equal to 77 inches when using a 0.55" imager. As would be understood given the present description, the throw distance can vary based on factors such as screen diagonal size and image format.

In addition, the optical engine is designed so that little or no keystone correction is necessary, while distortion is reduced. For example, distortion values for the projected image can be less than or equal to 2%, preferably less than or equal to 1.0%, and more preferably less than or equal to 0.5% (e.g., where distortion (d) can be determined by: d=(H−h)/h*100, where h is the paraxial image height and H is actual image height).

With the exemplary optical engine, a lower-cost, short throw distance, front projection display device design is achieved while using less complex TIR parts. Larger size (e.g., greater than 40 inches (diagonal)) images can be obtained from short distances and at extreme off-axis positions, while keeping the display cabinet relatively thin. In addition, the optical engine of the invention described is substantially distortion free and requires little or no keystone correction.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wide-angle projection lens module comprising the following components in sequential order from an output side:
   (a) a first lens group with a convex aspheric reflective surface;
   (b) a second lens group of negative refractive power having at least one aspheric surface;
   (c) a third lens group of substantially zero refractive power, wherein an aperture stop of the wide-angle projection lens module lies within or near the third lens group; and
   (d) a fourth lens group of positive refractive power,
   wherein the following Conditions (1) to (4) are satisfied:

$$10 < |F_1/F| < 30 \quad \text{Condition (1)};$$
   $$4.0 < |F_2/F| < 8.0 \quad \text{Condition (2)};$$
   $$25 < |F_3/F| < 50 \quad \text{Condition (3)};$$
   and
   $$3.5 < |F_4/F| < 6 \quad \text{Condition (4)},$$

where:
   F is the focal length of the wide-angle projection lens module;
   $F_1$ is the focal length of the first lens group;
   $F_2$ is the focal length of the second lens group;
   $F_3$ is the focal length of the third lens group; and
   $F_4$ is the focal length of the fourth lens group.

2. The wide-angle projection lens module of claim 1, wherein the wide-angle projection lens module is incorporated in a front projection display system.

3. The wide-angle projection lens module of claim 1, wherein the wide-angle projection lens module is incorporated in a rear projection display system.

4. The wide-angle projection lens module of claim 1, wherein the first lens group comprises a rotational symmetrical convex aspheric folding mirror.

5. The wide-angle projection lens module of claim 1, wherein the second lens group comprises a first lens element and a second lens element, a first surface of the first element having a radius of curvature substantially equal to that of a second surface of the second lens element, and the first surface contacts the second surface.

6. The wide-angle projection lens module of claim 1, wherein the following Conditions (5) further satisfies:

$$|\text{Diameter of the image circle}/F| > 4.5 \quad \text{Condition (5)},$$

where,
   Diameter of the image circle is equal to 2 times that of a rear image height.

7. The wide-angle projection lens module of claim 1 having a speed of less than or equal to about F/2.8 and an effective focal length of about 4 mm.

8. The wide-angle projection lens module of claim 1, wherein the second lens group comprises two meniscus shaped lens elements nested with each other.

9. The wide-angle projection lens module of claim 1, wherein the third lens group comprises at least two cement lens elements.

10. The wide-angle projection lens module of claim 1, wherein the fourth lens group comprises at least four positive lens elements and at least two negative lens elements.

11. The wide-angle projection lens module of claim 1, wherein the fourth lens group comprises at least four positive lens elements, and an average Abbe value of all the positive lens elements of the fourth lens group is greater than 70.

12. The wide-angle projection lens module of claim 11, wherein the average Abbe value of all the positive lens elements of the fourth lens group is greater than 80.

13. A wide-angle projection lens module comprising the following components in sequential order from an output side:
   (a) a first lens group with a convex aspheric reflective surface;
   (b) a second lens group of negative refractive power, having at least one aspheric surface;
   (c) a third lens group of substantially zero refractive power, wherein an aperture stop of the wide-angle projection lens module lies within or near the third lens group; and
   (d) a fourth lens group of positive refractive power,
   wherein the following Conditions (1) to (4) are satisfied:

$$10 < |F_1/F| < 30 \quad \text{Condition (1)};$$
   $$4.0 < |F_2/F| < 8.0 \quad \text{Condition (2)};$$
   $$25 < |F_3/F| < 50 \quad \text{Condition (3)};$$
   and
   $$3.5 < |F_4/F| < 6 \quad \text{Condition (4)},$$

where:
   F is the focal length of the wide-angle projection lens module;
   $F_1$ is the focal length of the first lens group;
   $F_2$ is the focal length of the second lens group;
   $F_3$ is the focal length of the third lens group; and
   $F_4$ is the focal length of the fourth lens group.

14. The wide-angle projection lens module of claim 13, wherein the following Conditions (5) further satisfies:

$$|\text{Diameter of the image circle}/F| > 4.5 \quad \text{Condition (5)},$$

where,
   Diameter of the image circle is equal to 2 times that of a rear image height.

15. A wide-angle projection lens module comprising the following components in sequential order from an output side:
   a first lens group with a convex aspheric reflective surface;
   a second lens group of negative refractive power having at least one aspheric surface;
   a third lens group of substantially zero refractive power, wherein an aperture stop lies of the wide-angle projection lens module lies within or near the third lens group; and
   a fourth lens group of positive refractive power,
   wherein the following Conditions (1) to (4) are satisfied:

$$10<|F_1/F|<30 \quad \text{Condition (1)};$$

$$4.0<|F_2/F|<8.0 \quad \text{Condition (2)};$$

$$25<|F_3/F|<50 \quad \text{Condition (3)};$$

and $$3.5<|F_4/F|<6 \quad \text{Condition (4)},$$

where:

F is the focal length of the wide-angle projection lens module;

$F_1$ is the focal length of the first lens group;

$F_2$ is the focal length of the second lens group;

$F_3$ is the focal length of the third lens group; and $F_4$ is the focal length of the fourth lens group.

16. The wide-angle projection lens module of claim 15, wherein the following Conditions (5) further satisfies:

angle between any chief ray and optical axis<5 degrees   Condition (5).

17. The wide-angle projection lens module of claim 15, wherein the lens is incorporated in a front projection display system.

18. The wide-angle projection lens module of claim 15, wherein the first lens group comprises a single rotational symmetrical convex aspheric folding mirror.

19. The wide-angle projection lens module of claim 15, wherein the second lens group comprises a first meniscus shaped lens element nested with a second meniscus shaped lens element.

20. The wide-angle projection lens module of claim 15, wherein the third lens group comprises at least two cement lens elements.

21. The wide-angle projection lens module of claim 15, wherein the fourth lens group comprises at least four positive lens elements, and an average Abbe value of all the positive lens elements of the fourth lens group is greater than 70.

22. The wide-angle projection lens module of claim 21, wherein the average Abbe value of all the positive lens elements of the fourth lens group is greater than 80.

23. An optical engine for a display device, comprising:
a light source, providing a light beam;
a relay optical system; and
a wide-angle projection lens module, comprising:
   a first lens group, having a convex folding aspheric mirror disposed at an output side of the wide-angle projection lens module; and
   a second lens group of negative refractive power, having at least one aspheric surface, wherein the light beam travels from the light source, passing the relay optical system and the wide-angle projection lens module to generate an output image at a half field angle of at least about 65°, and the output image has substantially no distortion.

24. The optical engine of claim 23, wherein the output image has a half field angle of at least about 60°.

25. The optical engine of claim 23, wherein the output image has a half field angle of at least about 55°.

26. The optical engine of claim 23, wherein a projection image size of the output image is at least 50 inches (diagonal measurement), and requires substantially no keystone correction.

27. The optical engine of claim 23, wherein a projected image format of the output image is one of a 4×3 format, a 5×3 format and a 16×9 format.

28. The optical engine of claim 23, wherein the optical engine is incorporated in a front projection display system.

29. The optical engine of claim 23, wherein the optical engine is incorporated in a rear projection display system.

30. The optical engine of claim 23, wherein the second lens group comprises a first lens element of negative refractive power and a second lens element having an aspheric surface, wherein a ratio of a focal length of the second lens group to a focal length of the wide-angle projection lens module ($F_2/F$) has the relationship: $5<F_2/F<6$.

31. The optical engine of claim 30, wherein the wide-angle projection lens module further comprises a third lens group disposed adjacent the second lens group, the third lens group has refractive power, and a ratio of a focal length of the third lens group to a focal length of the wide-angle projection lens module ($F_3/F$) has the relationship: $35<F_3/F<40$.

32. The optical engine of claim 31, wherein an aperture stop of the wide-angle projection lens module is located at about the third lens group.

33. The optical engine of claim 31, wherein the wide-angle projection lens module further comprises a fourth lens group having a positive refractive power disposed adjacent the third lens group, and a ratio of a focal length of the fourth lens group to a focal length of the wide-angle projection lens module ($F_4/F$) has the relationship: $-4.5<F_4/F<-4$.

34. The optical engine of claim 23, wherein the second lens group comprises a first lens element of negative refractive power and a second lens element of substantially uniform thickness.

35. The optical engine of claim 23, further comprising:
a third lens group of substantially zero refractive power and wherein an aperture stop of the wide-angle projection lens module lies within or near the third lens group; and
a fourth lens group of positive refractive power,
wherein the following Conditions (1) to (4) are satisfied:

$$10<|F_1/F|<30 \quad \text{Condition (1)};$$

$$4.0<|F_2/F|<8.0 \quad \text{Condition (2)};$$

$$25<|F_3/F|<50 \quad \text{Condition (3)};$$

and $$3.5<|F_4/F|<6 \quad \text{Condition (4)},$$

where:

F is the focal length of the wide-angle projection lens module;

$F_1$ is the focal length of the first lens group;

$F_2$ is the focal length of the second lens group;

$F_3$ is the focal length of the third lens group; and $F_4$ is the focal length of the fourth lens group.

36. The optical engine of claim 35, wherein the second lens group comprises a first lens element of negative refractive power and a second lens element of substantially uniform thickness throughout.

37. A wide-angle projection lens module, comprising:
a reflective convex aspheric mirror; and
a refractive lens group of positive refractive power, wherein the following Conditions (1) to (2) are satisfied:

$$10<|F_1/F|<30 \quad \text{Condition (1)};$$

and $$4.0<|F_2/F|<8.0 \quad \text{Condition (2)},$$

where:

F is a focal length of the wide-angle projection lens module;

$F_{reflective}$ is a focal length of the reflective convex mirror; and $F_{refractive}$ is a focal length of the refractive lens group.

38. The wide-angle projection lens module as claimed in claim 37, wherein a Condition (3) further satisfies:

$$|\text{Diameter of the image circle}/F| > 4.5 \quad \text{Condition (3),}$$

where,

Diameter of the image circle is equal to 2 times that of a rear image height.

39. The wide-angle projection lens module as claimed in claim 37, wherein a Condition (3) further satisfies:

$$|d/F_3/F| < 10 \quad \text{Condition (3),}$$

where, d is a distance between the reflective convex mirror and a first refractive lens (L2) surface.

* * * * *